United States Patent [19]

Horowitz

[11] 4,134,417
[45] Jan. 16, 1979

[54] QUICK RELEASE VALVE

[75] Inventor: Charles Horowitz, Niles, Ill.

[73] Assignee: Sloan Valve Company, Franklin Park, Ill.

[21] Appl. No.: 752,132

[22] Filed: Dec. 20, 1976

[51] Int. Cl.² ............................................. G05D 7/00
[52] U.S. Cl. ................................. 137/102; 137/512.4; 137/533.27
[58] Field of Search ................... 137/102, 533.27, 853, 137/859, 512.4; 251/335 A, 335 B

[56] References Cited

U.S. PATENT DOCUMENTS

| 183,806 | 10/1876 | Kellogg | 137/533.27 |
|---|---|---|---|
| 2,718,897 | 9/1955 | Andrews | 137/102 |
| 3,116,095 | 12/1963 | Leighton | 137/102 |
| 3,631,877 | 1/1972 | Barosko | 137/102 |
| 3,739,801 | 6/1973 | Rudolph | 137/102 |
| 3,895,648 | 7/1975 | Stoll et al. | 137/102 |

FOREIGN PATENT DOCUMENTS

| 324819 | 9/1920 | Fed. Rep. of Germany | 137/533.27 |
|---|---|---|---|
| 912070 | 12/1962 | United Kingdom | 137/533.27 |

Primary Examiner—William R. Cline
Assistant Examiner—H. Jay Spiegel
Attorney, Agent, or Firm—Kinzer, Plyer, Dorn & McEachran

[57] ABSTRACT

A quick release valve for vehicle air brake systems includes a movable valve member positioned to close upon the valve exhaust port which valve member includes a body portion and a diaphragm. The areas of the valve member exposed to the valve supply and brake ports are only slightly different in size thereby permitting operation on the valve member in response to small pressure differentials between the valve supply and brake ports.

4 Claims, 2 Drawing Figures

QUICK RELEASE VALVE

SUMMARY OF THE INVENTION

The present invention relates to quick release valves for vehicle air brake systems and has particular relation to an improved valve structure permitting operation at small pressure differentials between the supply and brake ports.

One purpose of the invention is a quick release valve of the type described in which the areas of the valve member exposed to pressure at the supply and brake ports are only slightly different in size thereby permitting accurate response of the valve member to pressure differntials between said ports.

Another purpose is an improved valve member for use in a quick release valve in which valve member has a body portion and a diaphragm, with the diaphragm being attached to the valve housing.

Another purpose is a simply constructed, reliably operable quick release valve of the type described.

Another purpose is an easily assembled quick release valve of the type described having a minimum number of parts.

Other purposes will appear in the ensuing specifications, drawings and claims.

BRIEF DESCRIPTION OF THE DRAWING

The invention is illustrated diagrammatically in the following drawings wherein.

DESCRIPTION OF THE PREFERRED EMBODIMENT

The present invention relates to quick release valves for use in vehicle air brake systems and is an improvement on the valve shown in my prior U.S. Pat. No. 3,093,153. The principle difficulty with the valve shown in the subject patent is that the difference between supply pressure and brake chamber pressure required to open the valve to permit the brake pressure to exhaust was so large that the valve did not accurately follow changes in supply or input pressure. The present invention overcomes this problem by substantially reducing the difference in pressure areas on the valve member.

Figure 1:
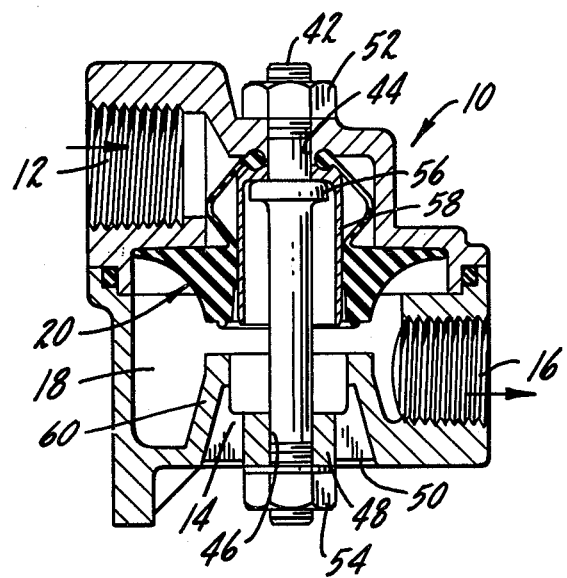
FIG. 1 is an axial section through a valve of the described.
Figure 2:
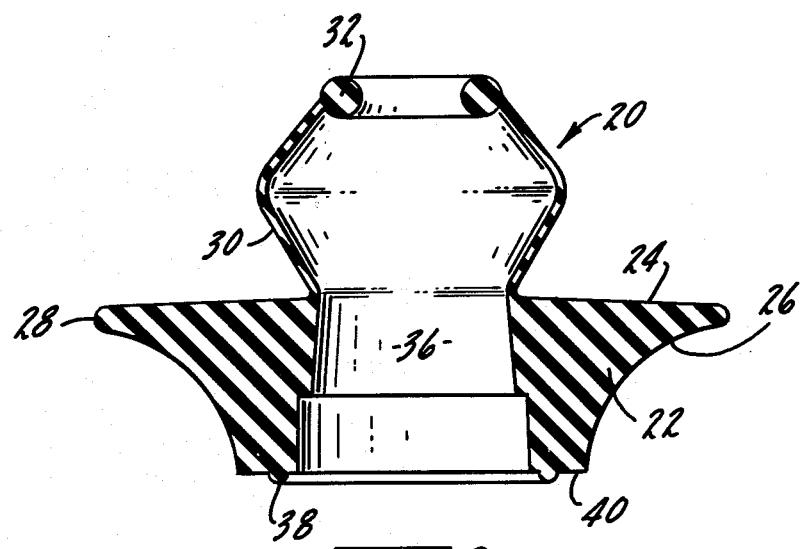
FIG. 2 is an enlarged axial section through the valve member.

In FIG. 1 the housing is indicated generally at 10 and may include an inlet or supply port 12, an exhaust port 14 and a pair of brake ports one of which is indicated at 16. A chamber 18 is formed within housing 10 and a valve member 20 is positioned within the chamber. Valve member 20 illustrated in detail in FIG. 2, includes a body portion 22 having an upper surface 24 and a lower curved surface 26 with surfaces 24 and 26 meeting at a peripheral edge 28. Valve member 20 is formed of a flexible distortable rubber-like material which permits the annular peripheral area to flex in response to pressure at supply port 12. Integral with body 22 is a diaphragm 30 which terminates in an integral ring 32 at its upper or outward end. Valve member 20 has a generally central bore 36 and a lower sealing surface 38 formed on the lower flat surface 40 of the body. A generally central rod 42 extends through an upper opening 44 and a lower opening 46 formed in a support boss 48 which in turn is joined to housing 10 by a plurality of ribs 50 integral with both the housing and boss 48. The oposite ends of rod 42 are threaded and nuts 52 and 54 are positioned on the threaded ends of the rod to hold the rod to housing 10.

Rod 42 may have an outwardly extending integral shoulder 56 which is used to mount a centrally disposed sleeve 58 inside of diaphram 30. Shoulder 56 and sleeve) 58 cooperate to mount diaphram ring 32 to the housing and thus to mount the valve member itself within housing chamber 18.

Housing 10 is completed by an integral upstanding boss 60 surrounding exhaust port 14 and which forms a seating and surface for selaing bead 38 as will be described hereinafter.

In operation, port 12 will be connected to the vehicle air supply and ports 16 will be connected to the vehicle air brakes. When pressure is applied at port 12 such pressure will be applied to surface 24 of body 22 and to those portions of diaphram 30 which extend outwardly of ring 32. Body 20 will move downwardly under the influence of such pressure until bead 38 seats and seals upon boss 60. In this position, communication between brake ports 16 and exhaust port 14 is closed. The pressure at supply port 12 will cause the peripheral portion of body 22 to flex downward thereby permitting communication between supply port 12 and brake ports 16.

There are differential pressure areas on valve member 24. Downwardly directed on closing pressure is created on surface 24 and those portions of diaphragm 30 which are peripherally outside of ring 32. Upwardly or opening pressures are created upon the underside of body 20 on all areas outside of sealing bead 38. The latter described area is slightly smaller than the areas formed by surface 24 and diaphragm 30 with the result that equal pressures at supply port 12 and brake port 16 will hold the valve in the described closed position. When there is a reduction in pressure at supply port 12, it is desired that the valve open. Since the difference in area between the surface exposed to pressure at brake ports 16 and the surface exposed to pressure at supply port 12 is essentially the difference between the diameter of bead 38 and the diameter of ring 32, a small drop in pressure at supply port 12 will be immediately followed by a lifting of valve member 20 so pressure may be exhausted through brake ports 16 and exhaust port 14.

It is the function of a quick release valve to quickly release pressure in the brake chambers. Thus, valve 20 should immediately follow any reduction in pressure at the supply port, which reduction in pressure will be brought about by the vehicle operator. With the described small difference in pressure areas on opposite sides of valve 20, there will be a quick and substantially immediate movement of the valve member in response to a reduction in pressure at supply port 12.

Whereas the preferred form of the invention has been shown and described herein, it should be realized that there may be a modification, substitutions and alterations hereto.

The embodiments of the invention in which an exclusive property or privilege is claimed are defined as follows:

1. A quick release valve for vehicle air brake systems including a housing, a supply port, an exhaust port, and at least one brake port opening into said housing;
    a valve member positioned within said housing to control communication between said ports, said valve member having a body with a peripheral flexible portion thereof being movable in response to pressure at said supply port to open communications between said supply and brake ports, a diaphragm integral with said body, said diaphragm extending away from said body and terminating in a ring portion, said diaphragm being attached to said housing, the area of said body and diaphragm exterior of said ring portion being in communication with said supply port;

a support sleeve positioned within said diaphragm and said body;

a rod extending entirely through said housing and coaxially aligned with said exhaust port, said sleeve and diaphragm ring portion being mounted to said housing through said rod;

a valve seat surrounding said exhaust port, one side of said valve member having a portion positioned for sealing contact with said valve seat to close communication between said brake and exhaust ports, the side of said valve member opposite said one side having an area in communication with said supply port which is only slightly larger than the area of said one side peripherally exterior of said portion, whereby said valve member is movable toward and away from said valve seat in response to small pressure differentials between said supply and brake ports.

2. The structure of claim 1 further characterized in that said rod includes an annular shoulder, said sleeve having a portion seated upon said annular shoulder and positioned between said shoulder and said ring portion.

3. The structure of claim 1 further characterized in that said body reciprocates toward and away from said exhaust port seat in response to pressure at said supply port, which action causes the expansion of said diaphragm.

4. The structure of claim 1 further characterized by and including an annular bead on said valve member portion positioned for sealing contact with an in alignment with said valve seat.

* * * * *